(12) United States Patent
Bauer et al.

(10) Patent No.: US 8,249,664 B1
(45) Date of Patent: *Aug. 21, 2012

(54) PROVIDING INTERACTIVE ALERT INFORMATION

(75) Inventors: German W. Bauer, San Jose, CA (US); Michael A. Cleron, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/186,143

(22) Filed: Jul. 19, 2011

Related U.S. Application Data

(63) Continuation of application No. 11/938,134, filed on Nov. 9, 2007, now Pat. No. 7,996,045.

(51) Int. Cl.
*H04M 1/00* (2006.01)

(52) U.S. Cl. ............ 455/566; 455/550.1; 455/466; 455/556.1; 345/173; 345/174; 345/175; 345/176; 345/177; 715/700; 715/701; 715/702; 715/752; 715/772

(58) Field of Classification Search .......... 455/566, 455/466, 556.1; 345/173–178; 715/700–702
See application file for complete search history.

(56) References Cited

U.S. PATENT DOCUMENTS

| 5,565,888 A | 10/1996 | Selker |
| 5,736,974 A | 4/1998 | Selker |
| 7,250,955 B1 | 7/2007 | Beeman et al. |
| 2005/0120306 A1 | 6/2005 | Klassen et al. |
| 2005/0188320 A1 | 8/2005 | Bocking |
| 2006/0101350 A1 | 5/2006 | Scott |
| 2006/0267783 A1 * | 11/2006 | Smith .................. 340/601 |
| 2008/0008239 A1 | 1/2008 | Song |
| 2008/0040693 A1 | 2/2008 | Toyama et al. |
| 2008/0307305 A1 | 12/2008 | Klassen et al. |
| 2009/0006570 A1 | 1/2009 | Forstall et al. |
| 2009/0069038 A1 | 3/2009 | Olague et al. |

OTHER PUBLICATIONS

Southern Oregon University, Windows XP—File Management, 6 pages, Sep. 21, 2006, accessed online from http://www.sou.edu/it/howtodocs/winxp/xpwinexplorer.shtml?print_version, Jun. 5, 2008.
University of Wyoming, Microsoft Outlook E-Mail Notification, 4 pages, Jul. 2005, accessed online from http://uwadmnweb.uwyo.edu/cessupport/Microsoft/Outlook/email_notification.asp, Jun. 5, 2008.

* cited by examiner

*Primary Examiner* — Fayyaz Alam
(74) *Attorney, Agent, or Firm* — Fish & Richardson P.C.

(57) ABSTRACT

In some implementations, a computer-implemented method of displaying alert information with a mobile communication device includes displaying device status indicators to a user of a mobile device in a status area; receiving information from an application to display an alert in the status area; displaying in the status area a first level of information for the alert and a user-selectable control; and displaying, in response to a selection of the user-selectable control, a second level of information for the alert that provides greater detail than the first level of information.

26 Claims, 12 Drawing Sheets

PROVIDING INTERACTIVE ALERT INFORMATION

CROSS-REFERENCE TO RELATED APPLICATIONS

This application is a continuation application of, and claims priority to, U.S. application Ser. No. 11/938,134, filed on Nov. 9, 2007, the entire contents of which are herein incorporated by reference.

TECHNICAL FIELD

This document relates generally to providing interactive alert information, and more particularly, to providing interactive alert information with a mobile computing or communication device.

BACKGROUND

A mobile computing or communication device (e.g., a smartphone, cell phone, personal digital assistant (PDA), etc.) may display status indicators associated with various system resources. For example a device may display a battery-shaped power meter that graphically depicts how much power remains in a battery included in the device; as power is consumed by the device, the power meter may change shape or character (e.g., the power meter may appear less "shaded" or filled-in as power is consumed). As another example, the device may display an antenna-shaped graphic having a number of "bars" that depict a relative strength of a signal that the device is capable of receiving from a corresponding wireless communication network; a stronger signal may be associated with more bars in the antenna graphic, and a weaker signal may be associated with fewer bars in the antenna graphic. As another example, the device may display various icons to depict a mode that the device is in. In particular, a telephone-shaped icon with wavy lines on either side may indicate a courtesy mode; an automobile-shaped icon may indicate a driving mode (e.g., one in which the device is configured to receive voice commands from a user).

SUMMARY

This document describes methods and systems for providing interactive alert information (e.g., interactive indicators or icons) in a device such as a mobile computing or communication device that can provide a user of the device with progressively more information about an event (e.g., the receipt of an email) in response to the user's interaction with the alert information. In particular, for example, multiple levels of detail corresponding to alert information can be provided. The multiple levels of detail can include a first level of information, which can be displayed with an initial interactive alert indicator; a second level of information can be displayed when a user of the device selects the initial interactive alert indicator; a third level of information can be displayed when the user selects the interactive alert indicator a second time (or selects a display of the second level of information). In some implementations, the device provides a mechanism for displaying interactive alert information for any application running on the device.

In some implementations, a computer-implemented method for displaying alert information includes in a mobile smartphone having a touch-sensitive display screen, displaying device status indicators to a user of the smartphone in a status area; receiving information from an application to display an alert in the status area; displaying in the status area a first level of information for the alert and a user-selectable control; displaying, in response to user selection input selecting the user-selectable control, a second level of information for the alert that provides greater detail than the first level of information; and in response to additional user selection input selecting the second level of information, activating an application associated with the received information, wherein the application is focused on a third level of information for the alert that provides greater detail than the first level or second level of information. The user selection input and the additional user selection input can be received through user contact with the touch-sensitive screen.

In some implementations, a computer-implemented method for displaying alert information with a mobile communication device includes displaying device status indicators to a user of a mobile device in a status area; receiving information from an application to display an alert in the status area; displaying in the status area a first level of information for the alert and a user-selectable control; and displaying, in response to a selection of the user-selectable control, a second level of information for the alert that provides greater detail than the first level of information. The second level of information can be displayed in a pop-up box near the user-selectable control.

The computer-implemented method can further include superimposing the first level of information over the device status indicators. Superimposing the first level of information over the device status indicators can include scrolling the first level of information through the status area over the device status indicators. The first level of information can include preview content related to the second level of information. The computer-implemented method can further include removing the preview content after a user review period.

The computer-implemented method can further include increasing a size of the user-selectable control while the user-selectable control is being selected and permitting selection of another user-selectable control by movement of a selector. Increasing the size of the user-selectable control can include increasing the size of the user-selectable control one or more times, to a predetermined maximum size, while the user-selectable control remains selected.

The computer-implemented method can further include activating an application associated with the received information, wherein the application is focused on a third level of information for the alert that provides greater detail than the first level or second level of information. Activating the application can include activating the application in response to a selection of the second level of information.

In some implementations, the first level of information includes a short message service (SMS) snippet, the second level of information includes an SMS message, and the application includes an SMS message manager. In some implementations, the first level of information includes an electronic mail snippet, the second level of information includes an electronic mail message portion that is larger than the snippet, and the application includes an electronic mail application.

In some implementations, a computer-implemented mobile device alert management system includes an interface configured to receive status alert information from applications on a mobile device; an alert management module configured to receive the status alert information from the interface and provide multiple levels of detail of the status alert information; and a display module configured to receive the multiple levels of detail of the status alert information and to display to a user of the mobile device at least a first level of detail of the status alert information in a device display status area of a mobile device.

The alert management module can be configured to initially present the first level of detail of the alert information and to present a second level of detail when selection input is received, the selection input indicating that the first level of detail has been selected. The interface can be configured to activate an application associated with the status alert information when additional selection input has been received, the additional selection input indicating that the second level of detail has been selected.

The computer-implemented mobile device alert management can further include a touch-sensitive input device configured to receive the selection input. The interface can be configured to prevent the display module from being directly accessed by the applications. The interface can be configured to receive the status alert information from an application and initiate a protected function call that incorporates at least a portion of the received status alert information, wherein the protected function call is not directly accessible to the applications.

The computer-implemented mobile device alert management system can further comprising a static indicator module configured to display in the status area status information pertaining to the overall operation of the mobile device, wherein the status information includes at least one of an indication of remaining on-board power in the mobile device or an indication of signal strength of a wireless channel over which the mobile device sends and receives information. The display module can be configured to display the alert information in the status area of the mobile device in a manner that is more prominent than the status information during a user-review period.

In some implementations, a computer-implemented mobile device alert management system includes an interface configured to receive status alert information from applications on a mobile device; an alert management means for receiving the status alert information from the interface and providing multiple levels of detail of the status alert information; and a display module configured to receive the multiple levels of detail of the status alert information and to display to a user of the mobile device at least a first level of detail of the status alert information in a device display status area of the mobile device.

The details of one or more implementations are set forth in the accompanying drawings and the description below.

DESCRIPTION OF DRAWINGS

Like reference symbols in the various drawings indicate like elements.

DETAILED DESCRIPTION

This document describes methods and systems for providing interactive alert information (e.g., interactive indicators or icons) in a device such as a mobile computing or communication device that can provide a user of the device with progressively more information about an event (e.g., the receipt of an email) in response to the user's interaction with the alert information. In particular, for example, multiple levels of detail corresponding to alert information can be provided. The multiple levels of detail can include a first level of information, which can be displayed with an initial interactive alert indicator; a second level of information can be displayed when a user of the device selects the initial interactive alert indicator; a third level of information can be displayed when the user selects the interactive alert indicator a second time (or selects a display of the second level of information). In some implementations, the device provides a mechanism for displaying interactive alert information for any application running on the device.

Figure 1:
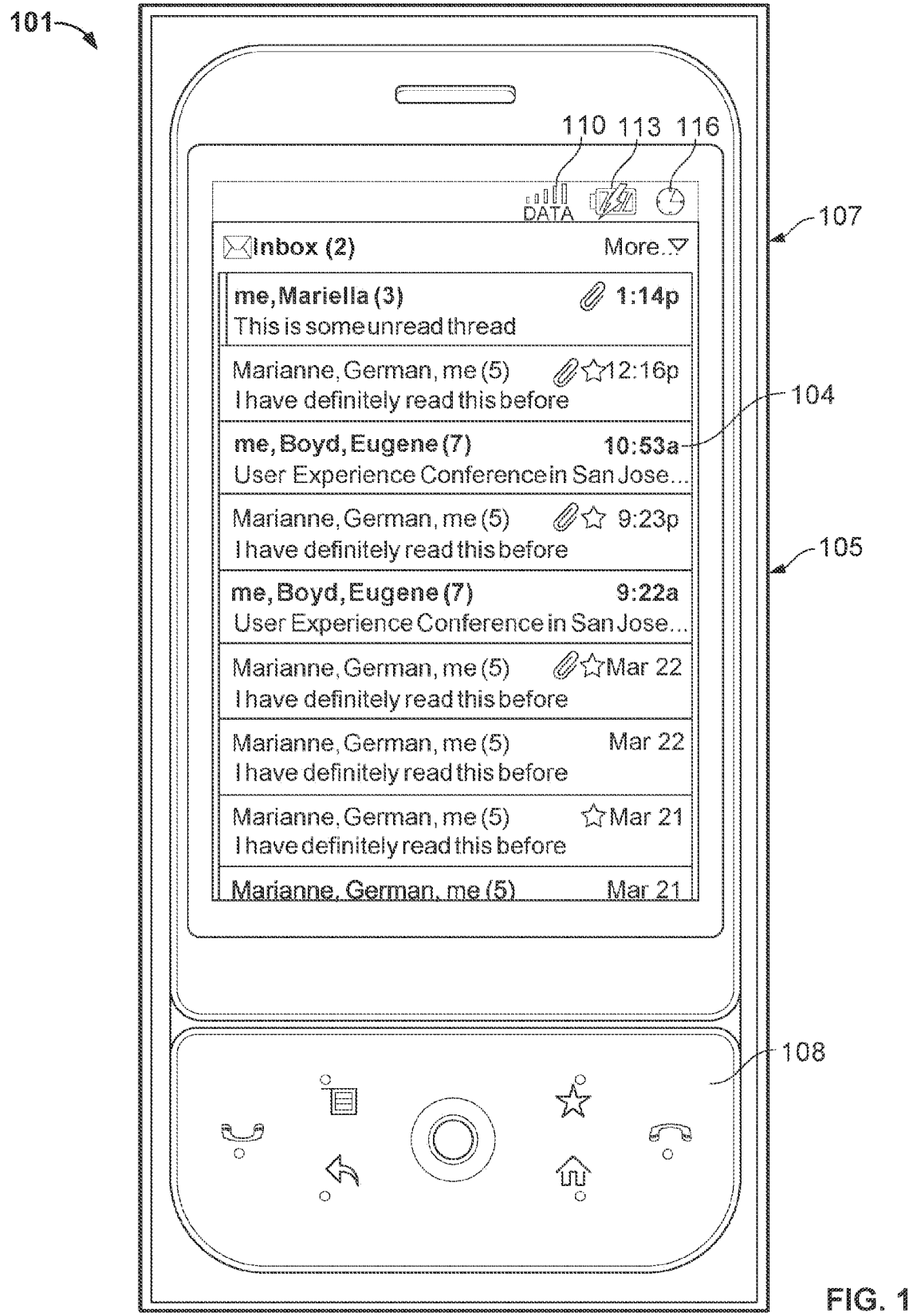
FIG. 1 illustrates an example mobile device that can display interactive indicators.
Figure 2A:
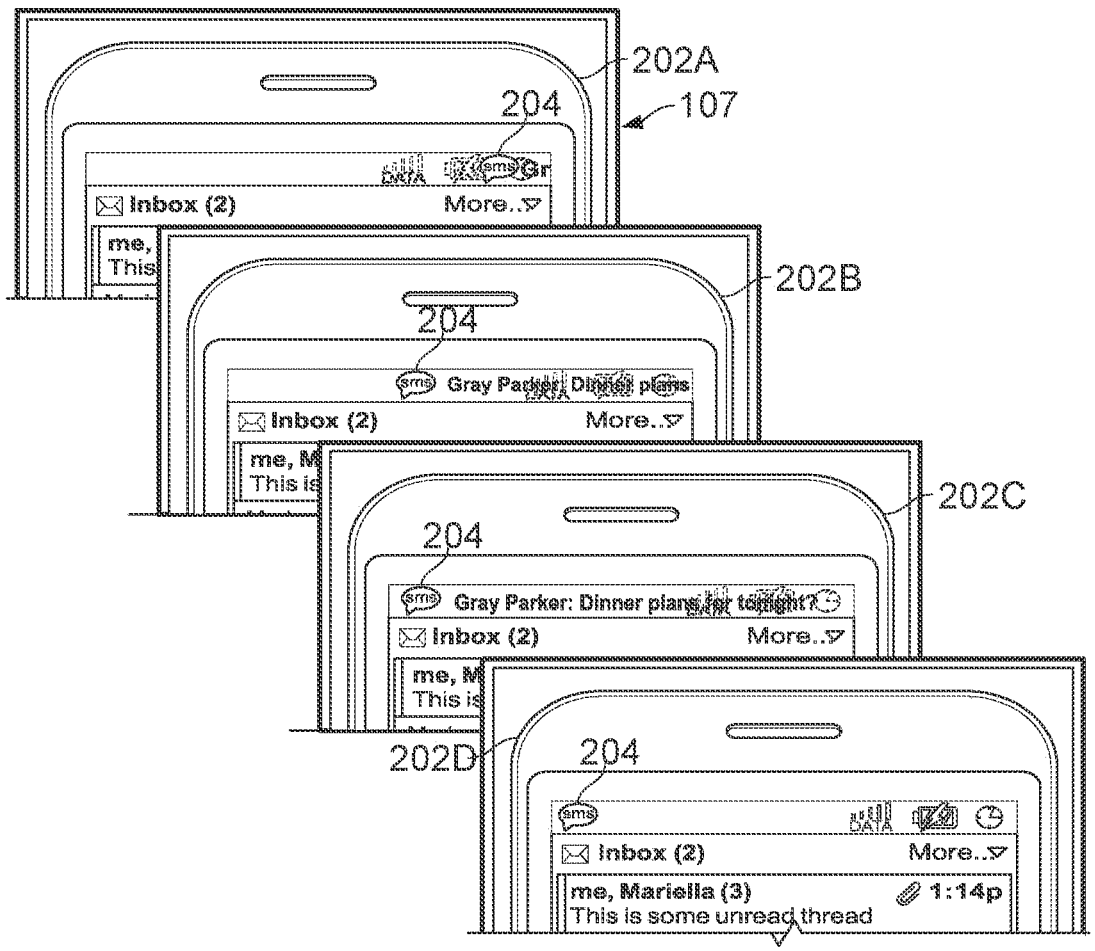
FIGS. 2A and 2B illustrate two examples of interactive indicators that provide a first level of information.
Figure 2B:
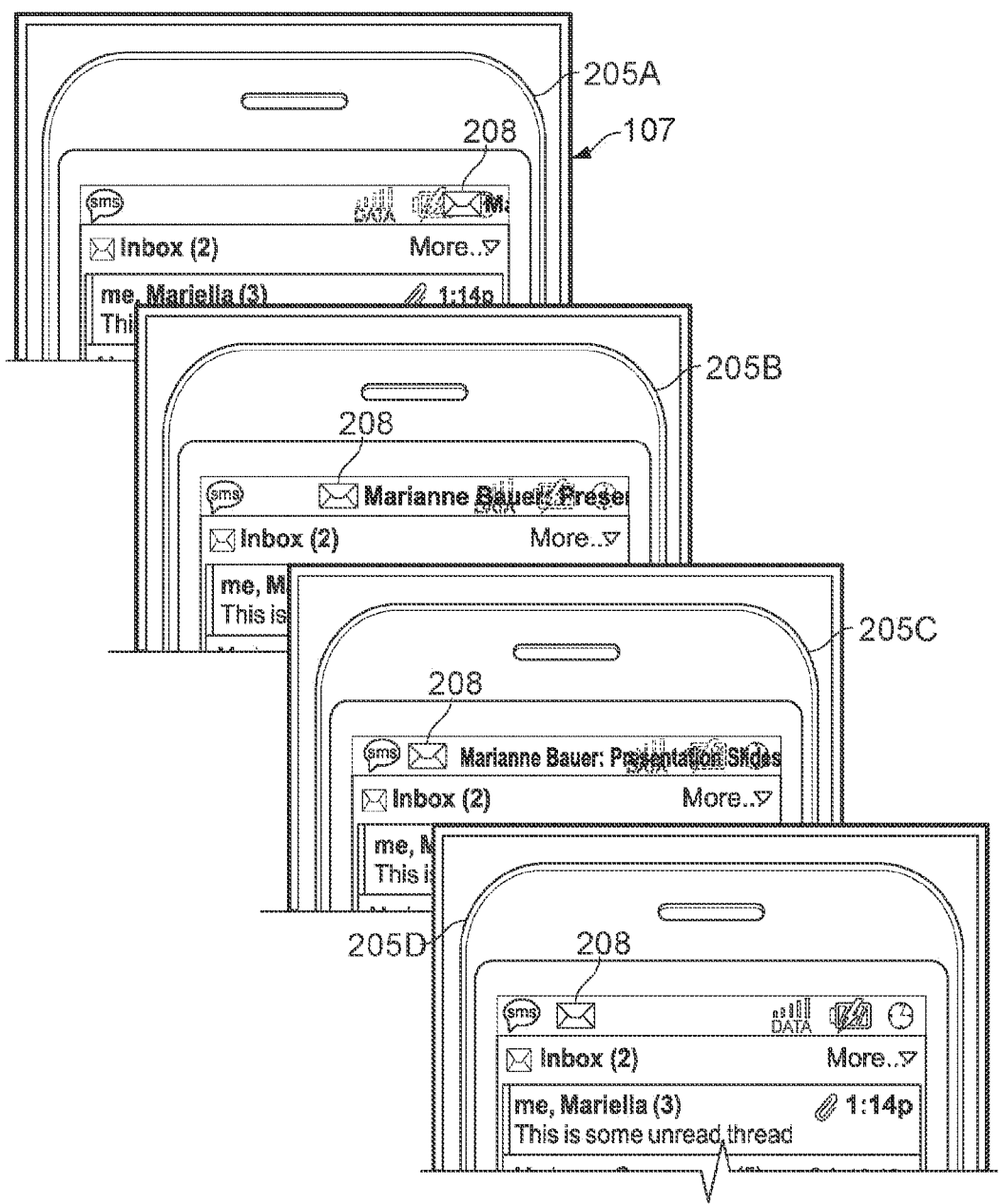
Figure 3A:
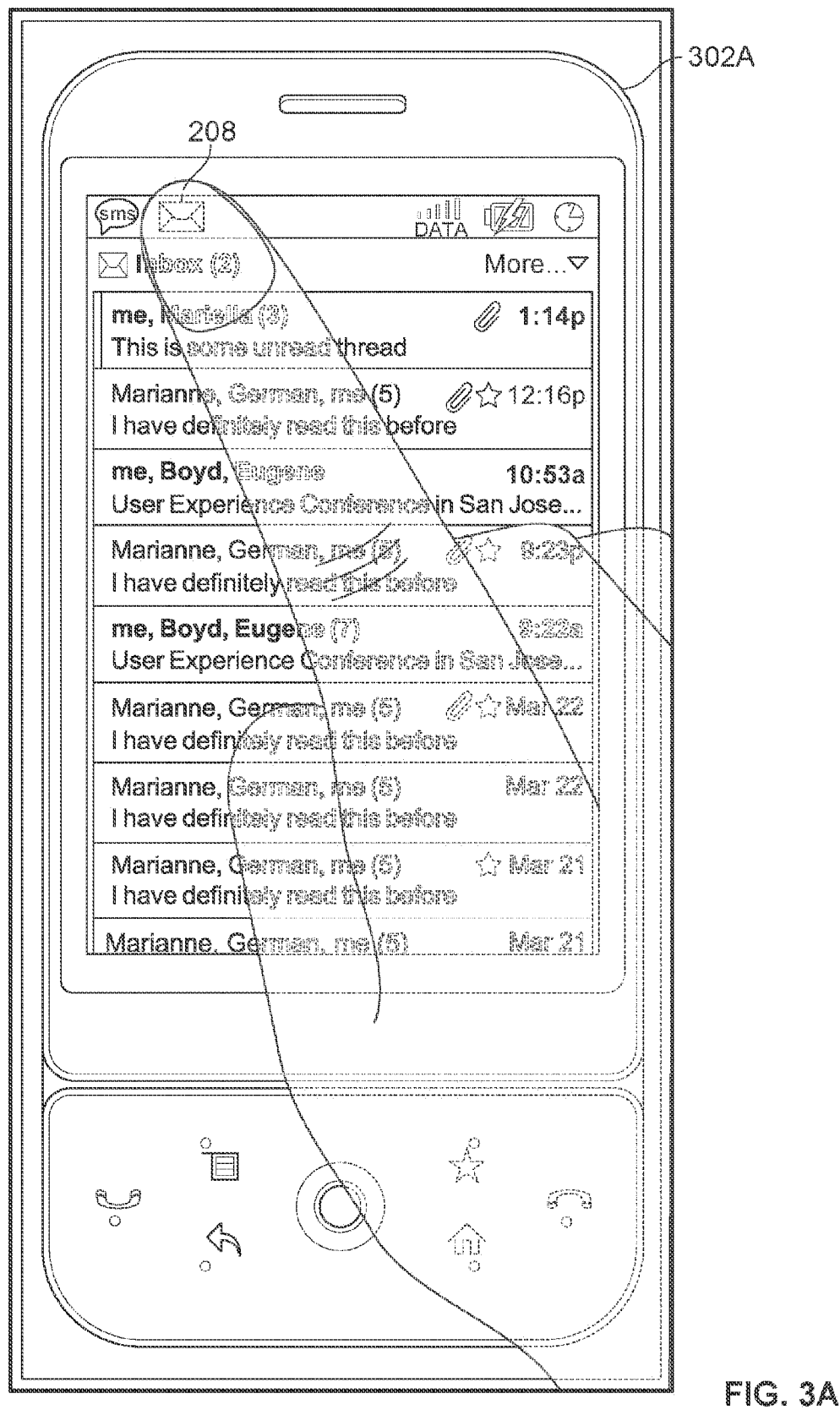
FIGS. 3A and 3B illustrate an example of a user interacting with a status indicator to provide a second level of information.
Figure 3B:
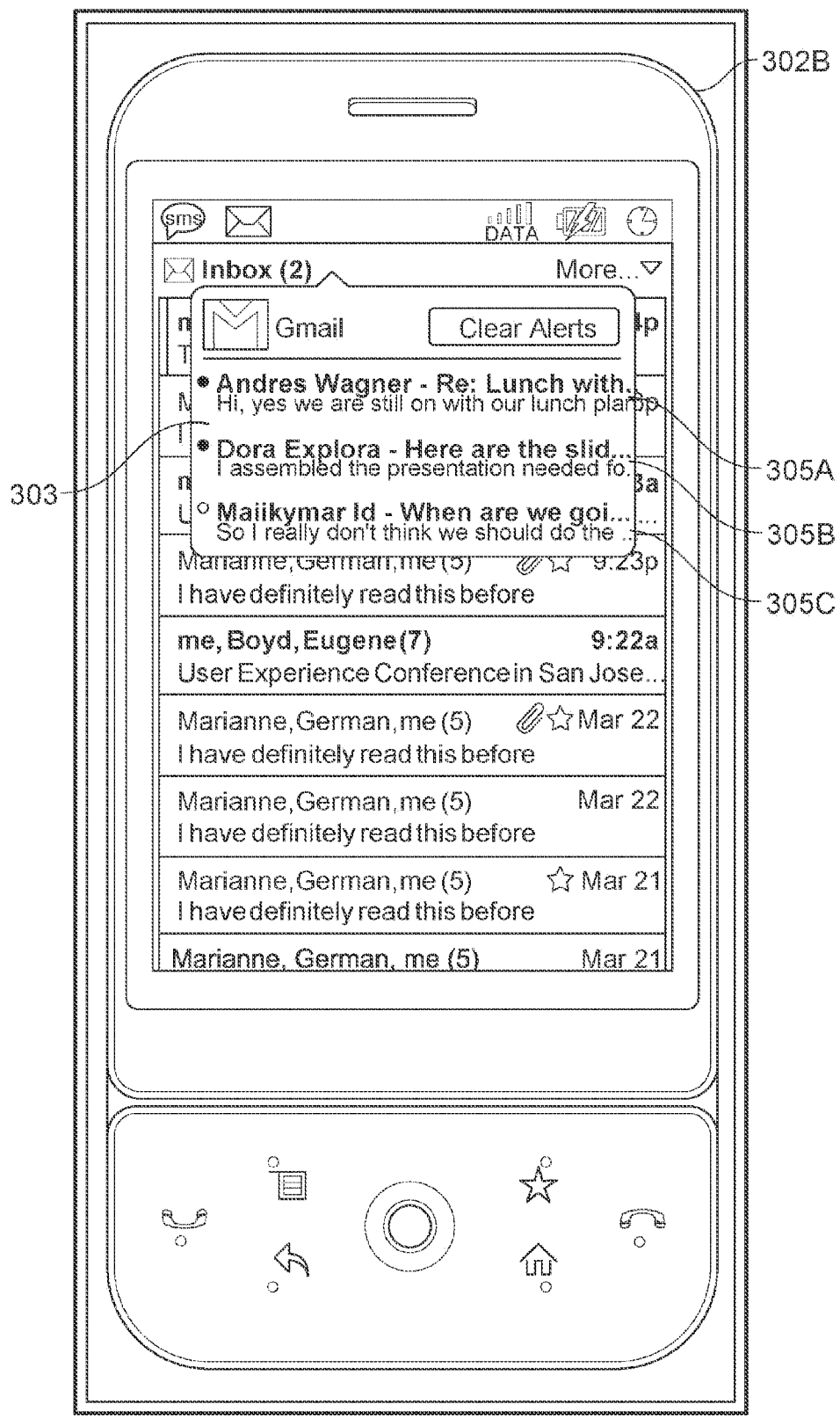

FIG. 1 illustrates an example mobile device that can display interactive indicators. FIGS. 2A and 2B illustrate two examples of status indicators that provide a first level of information. FIGS. 3A and 3B illustrate an example of a user interacting with a status indicator to provide a second level of information. In some implementations, a third level of information associated with an interactive indicator can be provided when the user interacts with the second level of information that is illustrated in FIGS. 3A and 3B. The remaining figures provide additional detail of mobile devices that can provide interactive indicators in the manner shown in and described with reference to FIGS. 1, 2A, 2B, 3A and 3B.

Turning to FIG. 1, an example mobile device 101 that can display interactive indicators is shown. The mobile device 101 is shown as a slider-style smartphone, but the mobile device 101 can be any mobile communication or computing device, such as a cell phone, personal digital assistant (PDA), media player, navigational device, etc. Typically, such devices provide various computing resources that enable a user to interact with the device through input/output facilities, and in particular, to run applications that enable the user to process data or media in some manner. Some such devices also provide communication facilities, such as voice, data and messaging services. Additional example details of mobile devices are provided below, for example, with reference to FIGS. 6-10. The exact type of mobile device is not critical to this description, and the reader will appreciate that the principles described herein can be applied to other devices that are not traditionally characterized as mobile devices. For example, the principles described herein can be advantageously applied to other devices having touch-sensitive displays, such as, for example, dash-mounted vehicle navigation systems and display-equipped consumer appliances (e.g., washers, dryers, dishwashers, microwaves, refrigerators, wine cabinets, coffee makers, etc).

As depicted in one implementation in FIG. 1, the mobile device 101 (also referred to as the "smartphone 101") includes a display screen 104 for displaying graphical information to the user, and various buttons and keys to receive input from the user. In some implementations, additional keys are available under the display screen 104 and can be accessed by sliding the screen up and away from a bottom portion 108.

In some implementations, the display screen 104 is a touch screen that is configured to receive tactile input from the user. For example, when the mobile device 101 detects that an object (e.g., a user's finger or a stylus) is in contact with the display screen 104, the mobile device 101 can cause a keyboard image (e.g., a soft keyboard) to be displayed. The user can contact specific portions of the display screen 104 above the keyboard image to provide corresponding input to the mobile device 101. Various other details of mobile devices, such as the mobile device 101, are described below with reference to FIGS. 4 and 6-10.

As shown in one implementation, the display screen 104 includes two areas: an application area 105 that consumes much of the screen real estate, and a status bar 107. The mobile device 101 can employ the application area to display menus of applications that are available to users of the mobile device 101 or information associated with one or more applications that may be currently running on the mobile device 101. For example, for purposes of illustration, a messaging application is depicted in the application area 105.

In some implementations, the status bar 107 is a standard area where various system status information can be displayed. As an example of typical system status information, a signal-strength indicator 110 that graphically includes four bars is shown, which may correspond to a detected strength of a wireless communication signal that is currently available to the mobile device 101. As the strength of the signal changes, the number or character of the bars may change. For example, detection by the mobile device 101 of a small decrease in signal strength may cause the device to display only the three smallest bars, or to display outlines of all four bars but only fill in the smallest three bars. A "DATA" indicator is shown below the four bars and may indicate a type of wireless signal that is available or a current mode of the device. In other modes, other indicators may be displayed (e.g., "VOICE," "ANALOG," "DIGITAL," "CDMA," "GSM," etc.). As another example of a type of system status information, a battery icon 113 is depicted. A fraction of the battery icon 113 that is filled in may correspond to a fraction or percentage of power remaining in a battery that is included in the mobile device 101. The lightning bolt icon that is displayed over the battery icon may indicate that the power source is currently charging (e.g., that the mobile device may be connected to a charging device, such as an alternating current (AC) power adapter). As another example of a type of system status information, an analog clock icon 116 is displayed that may apprise the user of the current time.

Each of the above-described example indicators may be a static indicator. For example, although the indicator may change based on environmental parameters (e.g., the character of the bars 110 may change based on a detected signal strength, the battery icon 113 may change based on a current level of power in a power source in the device, and the clock icon 116 may change with the time), the static indicators may not change in character or appearance, or provide additional information, in response any user's attempts to interact with the static indicators. Moreover, many example static indicators may be associated with system functions or parameters of the mobile device 101 rather than with specific applications that run on the mobile device 101. Other indicators that are associated with specific applications may be displayed (not shown, but may include, for example an envelope icon to indicate that a messaging application has received a new message), but such indicators may, likewise, be static in the sense of not supporting direct user interaction (e.g., the character or appearance of these indicators may not change in response to a user's attempts to interact with them).

The mobile device 101 may also provide interactive indicators (e.g., alerts). In contrast to the static indicators described above, interactive indicators can support user interaction. That is, an interactive indicator can be configured to progressively display more information in response to received user input associated with the interactive indicator. In particular, for example, an interactive indicator may initially provide a first level of information or detail about an application or parameter of the mobile device 101. In response to initial first user input associated with the interactive indicator, the interactive indicator may provide a second level of information or detail (e.g., more information or detail than is provided in the first level) about the application or parameter. In some implementations, subsequent user input associated with the interactive indicator can cause the interactive indicator to provide a third level of information or detail associated with the application or parameter. Providing additional levels of detail can, in some implementations, include activating an application or initiating a network communication corresponding to the interactive indicator. Examples of interactive indicators are provided in and discussed with reference to FIGS. 2A and 2B.

FIG. 2A illustrates time-sequenced screenshots from a portion of the display screen 104 that depict an example interactive indicator that provides a first level of information. The example depicted in FIG. 2A is one in which receipt of a short message service (SMS) message is announced with an icon 204 and preview content that are scrolled across the status bar 107. As shown in screenshot 202A, an "SMS" balloon 204 begins to appear at the right side of the status bar 107. The SMS balloon 204 scrolls to the left of the status bar, as depicted by screenshots 202B and 202C. In this example, a sender and message preview is provided during a user review period. The message preview may include the full text of very short messages, or it may include a first portion or snippet of the message (e.g., the first sentence, or an amount of the message that fits in the status bar, after the sender or a portion of identifying information for the sender is provided). After a short period of time (e.g., a user review period), the sender and message preview may be removed from the status bar, as depicted by screenshot 202D.

In some implementations, while the interactive indicator 204 scrolls across the status bar 107, the prominence of other status information may be reduced. For example, as shown in one implementation in screenshots 202A-C, the intensity of the static indicators 110, 113 and 116 is reduced, and the interactive indicator (e.g., the icon 204 and the corresponding preview) are superimposed over the static indicators. Once the preview content associated with the interactive indicator 204 is removed, the intensity of the static indicators may be restored, as depicted in screenshot 202D. Additional levels of detail or information may be displayed upon receipt of user input associated with the interactive indicator 204, as will be described in greater detail, with reference to FIGS. 3A and 3B.

FIG. 2B illustrates another set of time-sequenced screenshots from a portion of the display screen 104 that depict another example interactive indicator 208 that provides a first level of information. The example depicted in FIG. 2B is one in which receipt of an email message is announced with an envelope icon 208 and preview content that are scrolled across the status bar 107. As shown in screenshot 205A, the envelope icon 208 begins to appear at the right side of the status bar. The envelope icon 208 may scroll across the status bar 107 to the left, along with a preview of the email message (e.g., an indication of the sender and a subject or first portion of the body of the message), as depicted in screenshots 205B and 205C. As in the case of the SMS indicator, the preview associated with the email indicator may disappear after a user review period.

In some implementations, the user review period is preset for a period of time that may allow a user to read the preview content (e.g., 5, 10 or 30 seconds, or some other period). In some implementations, the user review period is user-configurable. In some implementations, the user review period may be influenced by how may other interactive alerts are queued for display. For example, if only a single interactive indicator is to be displayed, preview content associated with the single interactive indicator may be displayed for 30 seconds, whereas if five interactive indicators are to be displayed, preview content for each of the five interactive indicators may only be displayed for five or 10 seconds each.

In the above description, the interactive indicators are depicted and described as being scrolled across the screen. However, in other implementations, interactive indicators may be displayed differently. For example, an interactive indicator may immediately appear without scrolling (e.g., in the left corner of the status bar 107), but the interactive indicator may flash for an initial user review period (e.g., while corresponding preview content is displayed in either a flashing or fixed format). As another example, the interactive indicator may initially appear in one color or shade but change color or shade during or after a user review period. As another example, the interactive indicator may simply appear—with or without preview content—but without being displayed in a manner designed to capture the user's attention.

In some implementations, the interactive indicators are displayed immediately upon being activated. For example, in the context of the SMS example depicted in FIG. 2A or the email example depicted in FIG. 2B, the corresponding interactive indicator may appear as soon as the corresponding SMS or email message is received. In some implementations, the interactive indicators are displayed based on other input. For example, the mobile device 101 may include a component that detects when the mobile device 101 is in a particular position, such as a display-screen-up position, with the device at an angle that indicates a user is likely to be viewing the contents of the display screen. In such implementations, interactive indicators may be queued as they are activated (e.g., when the SMS and email messages are received in the example above), then displayed when the particular position is detected (e.g., when the device detects that the user is likely viewing the screen contents). As another example, the interactive indicators may be displayed when the display of the mobile device 101 is powered on (e.g., following a transition from a reduced power mode, such a dark-display sleep mode).

In some implementations, additional levels of information or detail may be provided when the mobile device 101 receives user input associated with an interactive indicator, as will now be described with reference to FIGS. 3A and 3B.

FIGS. 3A and 3B depict an example of a user interacting with the status indicator 208 to receive a second level of information. In particular, screenshot 302A depicts a user of the mobile device 101 selecting the interactive envelope indicator 208 by touching the graphical display above the indicator. This example depicts the mobile device 101 receiving user input through a touch-sensitive display 104. Alternatively, a device 101 that does not have a touch-sensitive display 104 could receive input to select the interactive indicator in another manner (e.g., with a button-controlled cursor).

Upon receipt of user input selecting the interactive indicator, a second level of information can be displayed, as depicted in screenshot 302B. In this example, a pop-up window 303 appears, which provides a second level of detail that provides more detail than is provided by the first level of detail. In particular, as depicted in one implementation, a sender, subject line and first portion of the body of an email message are provided (in contrast to just the sender and subject line depicted in screenshots 205A-D).

In some implementations, two inputs (e.g., two touch-selections) may be necessary to cause the pop-up window 303 to be displayed. In particular, touch input associated with the interactive indicator depicted in screenshot 302A may activate the interactive indicators. That is, the interactive indicators may be in an inactive state (e.g., a state in which input associated with them activates them but does not immediately bring up a second level of information). Upon receipt of input associated with one of the interactive indicators, the interactive indicator(s) may be transitioned to an active state (and the character of the interactive indicators may change, such as by being displayed in a slightly different window 304 (e.g., a larger floating window)). Subsequent input associated with a specific interactive indicator in its active state (e.g., the envelope icon 208) may then cause the pop-up window 303 to be displayed. In this manner, unwanted presentations of more detailed levels of information (which may otherwise result, for example, by inadvertent contact by the user with the status bar 107, and which may annoy the user) may be prevented. The window 304 can also provide another function and advantage, as is now described.

The window 304 can assist a user in accurately selecting a desired icon. In general, the window 304 shows an enlargement of a selectable object underneath what has been determined by the device to be a location of a finger or other pressing selection. The particular selected item under the selection is enlarged upon a touch in that location so that a user may more readily see what object was selected, in case the user did not intend to select that particular object. In some implementations, the objects on each side of the selected object may also be enlarged, either to the same extent as is the selected object or to a lesser extent so that the selected objects blend with the surrounding interface. Also, objects around the enlarged objects may lay underneath the newly enlarged objects, or may be pushed outward to make room for the enlarged objects. The level of enlargement may also increase one or more times (e.g., multiple times) while the user keeps his or her finger (or other pointer) pressed down, up until a maximum level of enlargement. The user may then roll or slide his or her finger or other pointer if the selected object is not the object he or she intended to select. A selection action may be invoked upon a pointer-up condition.

On devices with smaller screens, such a feature may provide certain usability advantages. For example, it may be preferable to provide greater resolution and additional objects from which a user may select. But such an approach may make it difficult for people with large fingers to select the right object, and the selected object (an adjacent objects that were intended for selection) may be hidden beneath their person's finger. By enlarging the objects when the person's finger is still pressed down, the system may enable the person to immediately see that there is a problem in their selection, and to correct that problem by moving their finger to the proper selection.

The second level of detail may be cumulative relative to multiple alerts, interactive indicators, or instances of an interactive indicator. For example, in the context of an email message indicator, the icon 208 and a corresponding preview may be scrolled across the status bar 107 each time an email message is received. For the first email message for which an interactive indicator is displayed, the interactive indicator may be displayed as depicted in screenshots 205A-D. For subsequent emails, another interactive indicator and corresponding preview content may be displayed as depicted in screenshots 205A-205C, but only a single interactive indicator may be ultimately displayed for the corresponding application. That is, only a single envelope icon 208 may remain after corresponding preview content has been removed from the status bar 107—regardless of how may email messages are announced with a scrolling icon 208. (In other words, even though each of multiple email messages may be announced, only a single envelope icon 208 may remain in the status bar 107.)

In this example, the second level of detail may include information for each email for which a first level of detail has been provided (e.g., a scrolling icon 208 and corresponding preview content). That is, as depicted in one example in screen shot 302B, the second level of detail (e.g., the pop-up window 303) includes detail 305A, 305B and 305C for three email messages that may have been received since a user last interacted with a corresponding icon 208. In other implementations, the details 305A, 305B and 305C could relate to messages in a corresponding email application that have some characteristic (e.g., they may be marked as unread, they may be from a particular sender, they may have a particular level of priority, they may be confidential, or they may have some combination of these or other attributes).

In some implementations, the mobile device is configured to receive additional input associated with the second level of detail. In response to the additional input, the mobile device 101 can provide a third level of detail in response to such additional input, or take some other action. For example, the mobile device 101 may activate an application associated with interactive indicator in response to user selection of the second level of detail. In particular, for example, a user could select the "Dora Explora" detail 305B to activate an email application.

Activating an application can include launching the application if it is not already running (i.e., actively loaded in temporary memory of the mobile device 101, such as RAM). Activating the application can also include giving the application focus (e.g., bringing a graphical user interface associated with the application to the foreground of the display, and setting the focus of appropriate input devices (a touch screen, application buttons, a soft keyboard, etc.) to that application. In this example, input associated with the "Dora Explora" detail 305B may bring the email application to the foreground.

Activating an application may cause the second level of detail (e.g., the pop-up window 303) to disappear. In some implementations, the first level of detail (e.g., the envelope icon 208) may also be removed from the display. For example, the mobile device may cause the envelope icon 208 to be removed from the status bar 107 when a corresponding email application is activated. In other implementations, the second level of detail (e.g., the pop-up window 303) disappears, but the first level of detail (e.g., the envelope icon 208 in the status bar 107) may remain. In the context of the above example, for instance, the envelope icon 208 may remain in the status bar until the second level of detail for the other messages (detail 305A and 305C) is selected, or until the corresponding massages are processed in some manner in the application (e.g., until the email messages are read in the email application).

Activating the application can also include setting the focus of the application to correspond to a third level of information associated with the interactive indicator. In the context of the above example pertaining to email messages, input associated with the "Dora Explora" detail 305B can cause the email application to activated, and the corresponding "Dora Explora" email to be opened (e.g., in a preview or editing pane, window or frame associated with the email application).

In some implementations, the second level of detail may facilitate additional user interaction. For example, selection of the detail 305B may cause the full corresponding message (or a larger portion thereof) to be displayed within the pop-up window 303), without causing the underlying application to be launched. As another example, selection of the detail 305B may activate various controls within the pop-up window 303 or in another pop-up window to dispose of corresponding content in the underlying application (e.g., in this context, controls may be provided for marking the "Dora Explora" message as read in the email application, or for deleting the message, or routing it to a folder, or taking some other action). In this manner, the interactive indicators can, in some implementations, enable the user of the mobile device 101 to efficiently process information without causing extra or unnecessary context switches in the mobile device 101 or on the display screen 104.

Examples have been provided in the context of SMS and email messaging applications, but interactive indicators can be provided for any application. Some such applications are applications that are provided with the mobile device (e.g., by the manufacturer of the mobile device or by the service provider associated with the mobile device); other applications are added to the mobile device by the user (e.g., by downloading them from a third party, by adding them through an interface that facilitates addition of user programs, or by direct programming by the user). In particular, as will be described in more detail with reference to other figures, some implementations permit interactive indicators to be associated with and activated by any application running on the mobile device. For purposes of illustration, two additional examples are briefly described.

One example of another application that can employ interactive indicators is an application that uses location-sensing technology in the mobile device to detect when the mobile device is nearing a bus stop (e.g., a location that has been registered or configured as a bus stop). Input from the location-sensing technology (e.g., a Global Positioning System (GPS) module) can cause an interactive indicator to appear in the status bar (e.g., an icon in the shape of a bus). Subsequent user selection of the interactive indicator can cause a pop-up window to appear from which the user can select particular information from a second level of detail, such as a specific bus route from a list of different bus routes (e.g., specific routes that are stored in the mobile device, that the user has previously configured, or routes that are downloaded (e.g., dynamically) from a third-party's site or service).

Subsequent user selection of the second level of detail can cause a third level of detail to be provided. In particular, for example, a time that a next bus for the selected route is to arrive at the bus stop nearest the mobile device may be displayed. Such information can be retrieved from data stored on the mobile device, or the information may be retrieved from a third-party's site or service (e.g., dynamically). As another example, the third level of detail could include a full schedule for the selected route, or an alternate route (e.g., if a bus recently passed the stop and some time will pass before another bus is expected).

An additional example of another application that can employ interactive indicators is an application for notifying a user when a particular profile available through a social networking service or site (e.g., FACEBOOK, MYSPACE, FRIENDSTER, etc.) is updated. An application running in the background on the mobile device may periodically query a social networking service to determine if a particular profile has recently been updated (e.g., a profile that a user of the mobile device has configured to be checked, or a profile recently visited from the mobile device). If the application determines that the profile has been updated since a previous query, an interactive indicator may be provided in the status bar 107 (e.g., an icon in the shape of a person's head).

Subsequent user selection of the interactive indicator may provide a second level of detail (e.g., a pop-up window indicating when the profile was updated). The second level of detail may provide additional information, such as the last time other profiles were updated that the mobile device user may be interested in. User selection of the second level of detail may cause a browser application to be activated and content to be retrieved from the corresponding profile (or another social networking application may be activated, possibly with a focus set to the corresponding profile).

The above examples illustrate various aspects of interactive indicators. The reader will appreciate that interactive indicators can be employed in any other context—for example, contexts where it is advantageous to provide a user with some sort of an alert message, and subsequently allow the user to interact with the alert message in order to receive progressively more information associated with the alert message or the underlying application or application data that caused the alert message to be launched.

Figure 4:
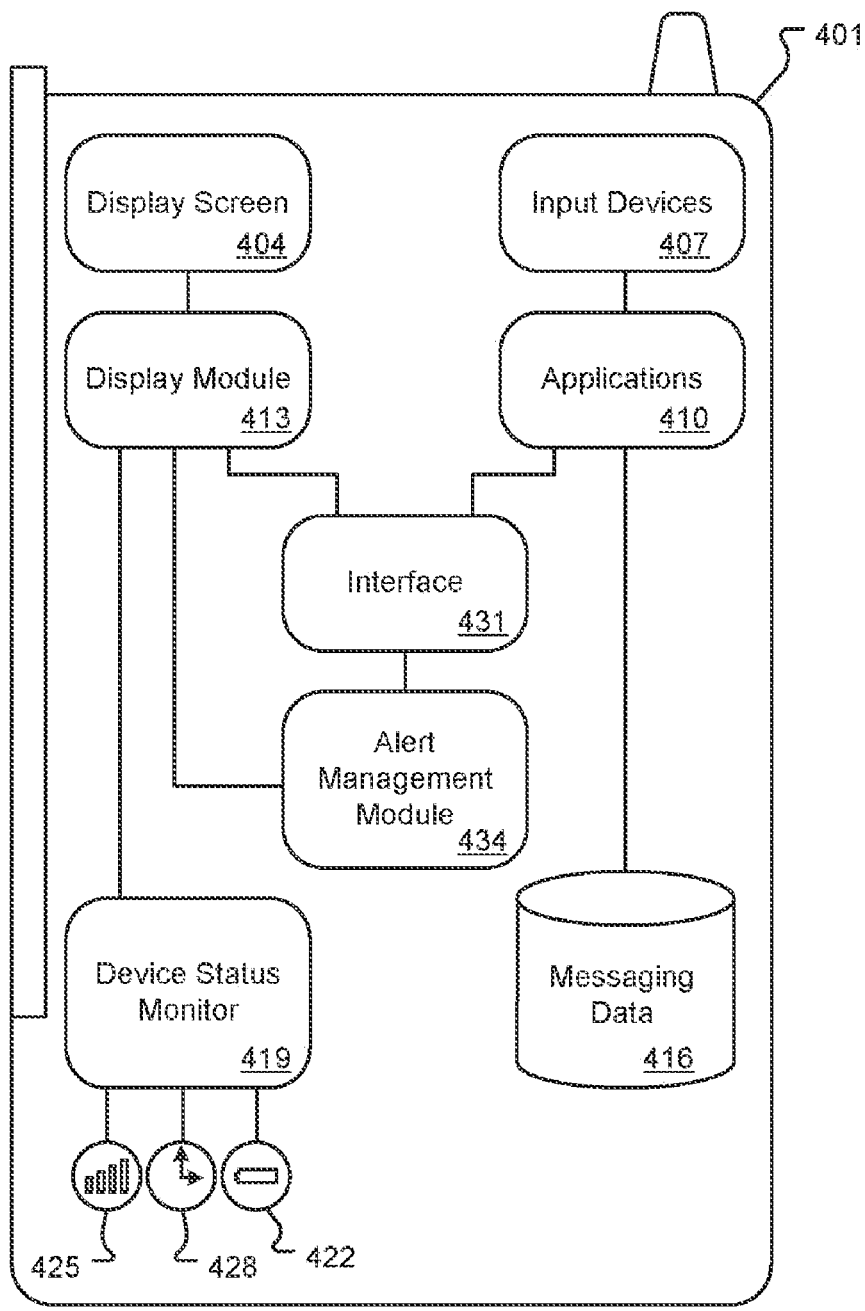
FIG. 4 is a block diagram illustrating certain details of a mobile device that can provide interactive indicators.

FIG. 4 is a schematic representation of an exemplary mobile device 401 that can implement interactive indicators as described herein. Additional details of mobile devices generally, such as the mobile device 101 or 401, are illustrated in and described with reference to FIGS. 6-10.

As depicted in one implementation in FIG. 4, the mobile device 401 includes a display screen 404 (and possibly other output devices, which are not shown), input devices 407 (e.g., buttons, a hard keyboard, a soft keyboard (such as an image of a keyboard on a touch-sensitive screen, etc.), and applications 410 (e.g., programming code stored in memory that can be executed by a processor to receive input from the input devices 407, process the input and present corresponding output in the display screen 404 or through other output devices. A display module 413 can include programming code and hardware necessary to receive information from the applications and from other sources, transform the information into a format that is suitable for controlling the display screen (e.g., a pixel format that specifies data for each pixel in the display screen including, for example, a row and column address, a color for the pixel, and an intensity for the pixel), and provide the transformed information to the display screen (or more particularly, a hardware interface that controls the display screen, in some implementations).

As described above with reference to other figures, some applications can include messaging applications (e.g., SMS or email applications). Accordingly, the mobile device 401 can include messaging data storage 416 reserved for the messaging data (e.g., an area for storing sent messages or messages in an inbox).

The mobile device 401 can also include a device status monitor 419 (e.g., a static indicator module) for monitoring various system aspects of the mobile device. For example, the device status monitor 419 can monitor the power remaining in a battery (depicted by element 422) included in the mobile device, and the device status monitor 419 can cause a graphical depiction of the remaining power to be displayed in the display screen by providing appropriate information to the display module 413. In particular, for example, the device status monitor 419 can cause a static indicator, such as the battery icon 113 that is shown in the status bar 107 in FIGS. 1, 2A and 2B, or the battery life indicator 616 shown in FIG. 6 (described more below). As another example, the device status monitor 419 can monitor signal strength (e.g., with a signal strength monitoring device 425 (e.g., a receiver) of a wireless communication signal that is currently available to the mobile device 401, and can cause an icon to be displayed that depicts the signal strength. In particular, for example, the device status monitor can 419 cause a static indicator, such as the four bars that are shown in the status bar 107 in FIGS. 1, 2A and 2B, or the signal strength indicator 615 shown in FIG. 6 (described more below). As another example, the device status monitor 419 can cause a current time to be displayed in the status bar 107 (e.g., as an analog clock icon or a digital indication of time), based on input received from a timing module (depicted as element 428—which could be, for example, an internal time-keeping mechanism, and/or a receiver that periodically extracts timing information from received wireless communication signals).

To provide interactive icon functionality, the mobile device 401 can include an interface 431 and an alert management module 434. In some implementations, the alert management module 434 receives alert information from one or more of the applications 410, and generates interactive icons in response to the alert information. In particular, with reference to the example interactive email indicator described above and illustrated in screenshots 205A-D (FIG. 2B), the alert management module 434 can receive information from a corresponding email application that an email message has been received. The alert management module 434 can also receive additional information about the email message, such as, for example, a corresponding sender, subject, and a portion of the content (e.g., a snippet of content) or the full body of the message.

With the additional information, the alert management module 434 can generate different levels of detail for the email message, which can be provided in an interactive indicator and in additional windows or applications that may be activated in response to user interaction with the interactive indicator. In particular, for example, the alert management module 434 can cause an initial icon to be displayed (e.g., the envelope icon 208 that is depicted as scrolling across the status bar in FIG. 2B, as well as the corresponding preview content (sender and subject)). The alert management module can also cause the pop-up window 303 depicted in FIG. 3B to be displayed in response to user interaction (e.g., user selection with a pointing device or with tactile input on a touch-sensitive screen).

In one implementation, as depicted in FIG. 4, the mobile device 401 can employ the interface 431 to receive information from the applications and provide this information to the alert management module 434 (possibly in a different format). The interface 431 can, in some implementations, shield the alert management module 434 and display module 413 from being directly accessed by the applications 410. By shielding the alert management module 434 and the display module 413, the interface 431 may protect the mobile device 401 from crashes, exceptions or other errors caused by poorly written or malicious programming code in the applications 410. Malicious code can be of particular concern in cases where aspects of the mobile device are open to direct interaction by custom applications that the user may add to the mobile device. For example, with an open architecture in which any developer can create new applications that use interactive indicator functionality, the interface 431 can intercept malicious of errant code before such code compromises the integrity of the display module 413 or the mobile device 401 itself.

In some implementations, the interface 431 can protect against errant or malicious code by providing information to the display module 413 or the alert management module 434 through controlled, protected function calls. That is, information to be displayed on the display screen 404 may be provided to the display module 413 only through protected function calls, and those protected function calls may only be accessible to the interface 431, rather than being directly accessible to the applications. In such scenarios, data may be passed from the applications 410 to the interface, along with requests (e.g., control signals) for the data to be passed to the display module 413 or the alert management module 434, but the applications may not have the capability to directly control the display screen 404 (or other hardware functionality), thereby reducing the risk that errant or malicious applications will be able to crash the mobile device The use of calls to protected functions by the interface 431 is just one example of how the mobile device 401 may protect against errant or malicious code crashing or otherwise causing undesirable behavior. Other methods can be employed to provide a mobile device that is resistant to malicious or errant code. For example, an operating system can rigorously manage various application threads or programs that may be running on the mobile device and terminate any threads or programs that are not behaving in predictable manners. More particularly, a thread that repeatedly attempts to make outgoing calls may be terminated; a thread that is consuming more than a threshold amount of processing time or memory without much corresponding output may also be terminated. As another example, certain functions within the mobile device may be restricted to respond only to function calls from certain regions of memory or from certain modules within the mobile device. Moreover, format of the function calls may be rigorously checked, and the function calls may be ignored if the format is not appropriate, in order to reduce the likelihood that malicious or errant function calls will be made. Other methods of protecting a device from errant or malicious code are known and contemplated.

Figure 5:
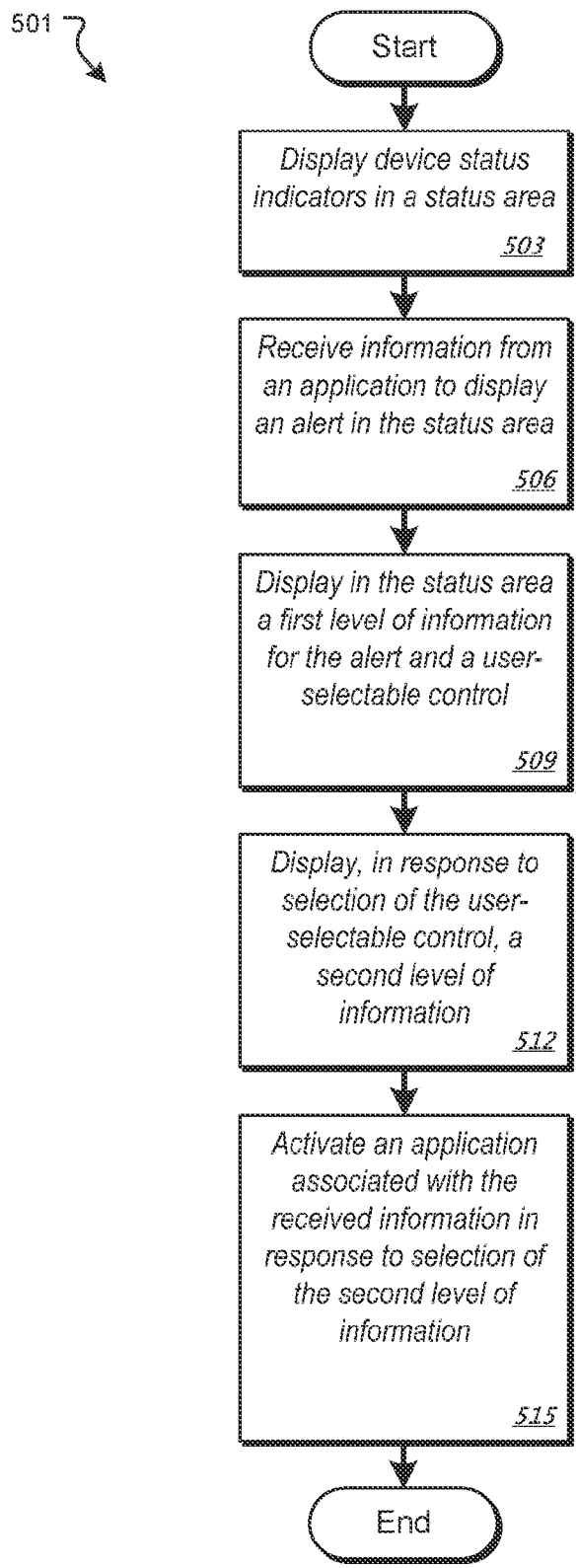
FIG. 5 is a flow diagram of an example method of providing interactive indicators with a mobile device.

FIG. 5 is a flow diagram of an example method 501 of providing interactive indicators with a mobile device. In operation, the method 501 can cause progressively more information to be provided in response to a user's interaction with an initial interactive indicator. For example, as described above, an interactive indicator and a first level of detail can be initially provided. In response to user input associated with the interactive indicator (e.g., user input from a touch-sensitive screen associated with the interactive indicator), a second level of detail can be provided (e.g., more detail than is provided initially). In some implementations, user input associated with the second level of detail can cause a third level of detail (e.g., more detail than provided by the first or second levels of detail) to be provided. In particular, for example, providing the third level of detail may include activating an application associated with the interactive indicator, and setting the focus of the application to information corresponding to the interactive indicator.

The method 501 can include displaying (503) device status indicators in a status area. For example, with reference to FIG. 1, static indicators for signal strength (element 110), remaining battery power (element 113) or current time (element 116) can be displayed in the status bar 107. With reference to FIG. 4, the static indicators may be displayed in response to information from the device status monitor 419 (e.g., information captured by monitoring elements 422, 425 or 428).

The method 501 can include receiving (506) information from an application to display an alert (e.g., an interactive indicator) in the status area of a display screen. For example, with reference to FIG. 4, the alert management module 434 can receive information (e.g., an indication that an email message has been received) from one of the applications 410 (e.g., an email messaging application). The alert management module 434 may receive the information indirectly, through the interface 431. That is, the appropriate application from the applications 410 may indicate to the interface 431 that an alert message (e.g., an interactive indicator) should be provided; the interface 431 may, in turn, provide this information to the alert management module 434 in a manner that protects the integrity of the mobile device 401 (e.g., through a protected function call).

The method 501 can include displaying (509) in the status area a first level of information for the alert (e.g., status alert information) and a user-selectable control. For example, with reference to FIG. 2B (and in the context of an interactive indicator associated with an email message), an envelope icon 208 can be displayed in the status bar 107 (e.g., scrolled across the status bar 107), and a first level of information can be provided with the icon 208 (e.g., preview content, such as a sender and subject line, or portion thereof, associated with the email). In some implementations, the preview content is displayed for a short period of time (e.g., a user review period, such as five seconds, 30 seconds, or some other period of time). The preview content can be displayed when the corresponding email is received, or in response to some other input (e.g., input indicating that the mobile device 401 is positioned such that a user is likely to be viewing contents of the display screen).

The method 501 can include displaying (512), in response to selection of the user-selectable control, a second level of information. For example, with reference to FIGS. 3A and 3B, user input, such as user selection on a touch-sensitive screen of the envelope icon 208, can cause the pop-up window 303 to be displayed, which can provide a second level of detail, which provides more detail that initially provided. In particular, for example, the second level of detail can include a snippet or portion of the body of the email message, as depicted by elements 305A-C.

In some implementations, the method 501 includes activating an application associated with the received information (515) that was received (506) to display the initial alert, in response to selection of the second level of information. For example, in response to user selection of the detail 305B in the pop-up window 303, an email application can be activated (e.g., brought to the foreground of the display or launched if not currently active), and focus in the application can be set to the content of the interactive indicator (e.g., the specific email message announced by the interactive indicator).

Figure 6:
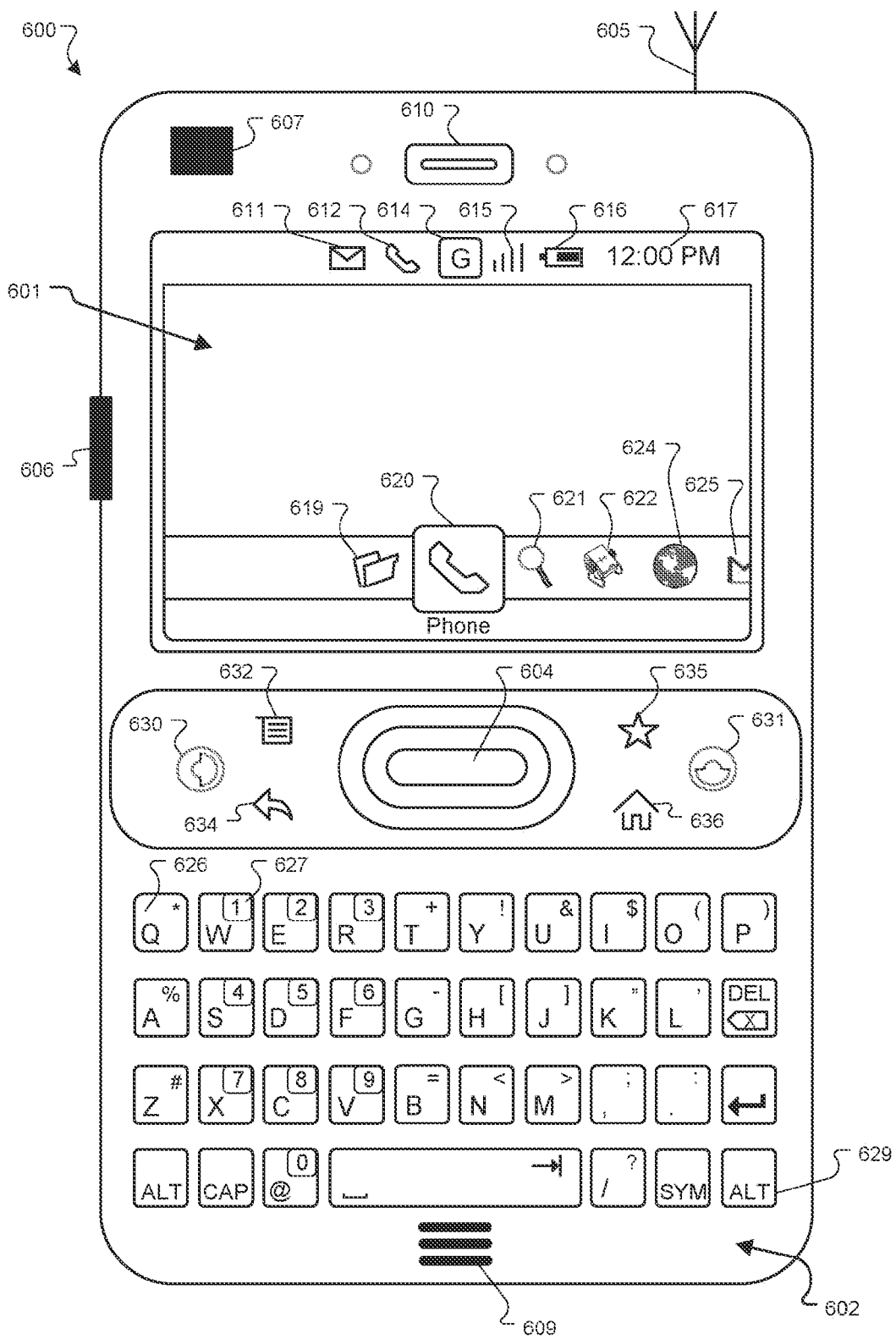
FIG. 6 is a schematic representation of an exemplary mobile device that can implement interactive indicators.

Referring now to FIG. 6, the exterior appearance of an exemplary device 600 that provides interactive indicators is illustrated. Briefly, and among other things, the device 600 includes a processor configured to provide interactive indicators, which can reveal progressively more information about an alert message, in response to user interaction with the corresponding interactive indicator.

In more detail, the hardware environment of the device 600 includes a display 601 for displaying text, images, and video to a user; a keyboard 602 for entering text data and user commands into the device 600; a pointing device 604 for pointing, selecting, and adjusting objects displayed on the display 601; an antenna 605; a network connection 606; a camera 607; a microphone 609; and a speaker 610. Although the device 600 shows an external antenna, the device 600 can include an internal antenna, which is not visible to the user.

The display 601 can display video, graphics, images, and text that make up the user interface for the software applications used by the device 600, and the operating system programs used to operate the device 600. Possible elements that may be displayed on the display 601 include, for example, a new mail indicator 611 that alerts a user to the presence of a new message; an active call indicator 612 that indicates that a telephone call is being received, placed, or is occurring; a data standard indicator 614 that indicates the data standard currently being used by the device 600 to transmit and receive data; a signal strength indicator 615 that indicates a measurement of the strength of a signal received by via the antenna 605, such as by using signal strength bars; a battery life indicator 616 that indicates a measurement of the remaining battery life; or a clock 617 that outputs the current time. Interactive indicators can also be dynamically displayed (not shown in FIG. 6) as described above.

The display 601 may also show application icons representing various applications available to the user, such as a web browser application icon 619, a phone application icon 620, a search application icon 621, a contacts application icon 622, a mapping application icon 624, an email application icon 625, or other application icons. In one example implementation, the display 601 is a quarter video graphics array (QVGA) thin film transistor (TFT) liquid crystal display (LCD), capable of 16-bit color or better.

A user uses the keyboard (or "keypad") 602 to enter commands and data to operate and control the operating system and applications that provide for interactive indicators. The keyboard 602 includes standard keyboard buttons or keys associated with alphanumeric characters, such as keys 626 and 627 that are associated with the alphanumeric characters "Q" and "W" when selected alone, or are associated with the characters "*" and "1" when pressed in combination with key 629. A single key may also be associated with special characters or functions, including unlabeled functions, based upon the state of the operating system or applications invoked by the operating system. For example, when an application calls for the input of a numeric character, a selection of the key 627 alone may cause a "1" to be input.

In addition to keys traditionally associated with an alphanumeric keypad, the keyboard 602 also includes other special function keys, such as an establish-call key 630 that causes a received call to be answered or a new call to be originated; a terminate call key 631 that causes the termination of an active call; a drop down menu key 632 that causes a menu to appear within the display 601; a backward navigation key 634 that causes a previously accessed network address to be accessed again; a favorites key 635 that causes an active web page to be placed in a bookmarks folder of favorite sites, or causes a bookmarks folder to appear; a home page key 636 that causes an application invoked on the device 600 to navigate to a predetermined network address; or other keys that provide for multiple-way navigation, application selection, and power and volume control.

The user uses the pointing device 604 to select and adjust graphics and text objects displayed on the display 601 as part of the interaction with and control of the device 600 and the applications invoked on the device 600. The pointing device 604 is any appropriate type of pointing device, and may be a joystick, a trackball, a touch-pad, a camera, a voice input device, a touch screen device implemented in combination with the display 601, or any other input device.

The antenna 605, which can be an external antenna or an internal antenna, is a directional or omni-directional antenna used for the transmission and reception of radiofrequency (RF) signals that implement point-to-point radio communication, wireless local area network (LAN) communication, or location determination. The antenna 605 may facilitate point-to-point radio communication using the Specialized Mobile Radio (SMR), cellular, or Personal Communication Service (PCS) frequency bands, and may implement the transmission of data using any number or data standards. For example, the antenna 605 may allow data to be transmitted between the device 600 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 606 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 606 may connect to a LAN network, a corporate or government WAN network, the Internet, a telephone network, or other network. The network connection 606 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 606 and the antenna 605 are integrated into a single component.

The camera 607 allows the device 600 to capture digital images, and may be a scanner, a digital still camera, a digital video camera, other digital input device. In one example implementation, the camera 607 is a 3 mega-pixel (MP) camera that utilizes a complementary metal-oxide semiconductor (CMOS).

The microphone 609 allows the device 600 to capture sound, and may be an omni-directional microphone, a unidirectional microphone, a bi-directional microphone, a shotgun microphone, or other type of apparatus that converts sound to an electrical signal. The microphone 609 may be used to capture sound generated by a user, for example when the user is speaking to another user during a telephone call via the device 600. Conversely, the speaker 610 allows the device to convert an electrical signal into sound, such as a voice from another user generated by a telephone application program, or a ring tone generated from a ring tone application program. Furthermore, although the device 600 is illustrated in FIG. 6 as a handheld device, in further implementations the device 600 may be a laptop, a workstation, a midrange computer, a mainframe, an embedded system, telephone, desktop PC, a tablet computer, a PDA, or other type of computing device.

Figure 7:
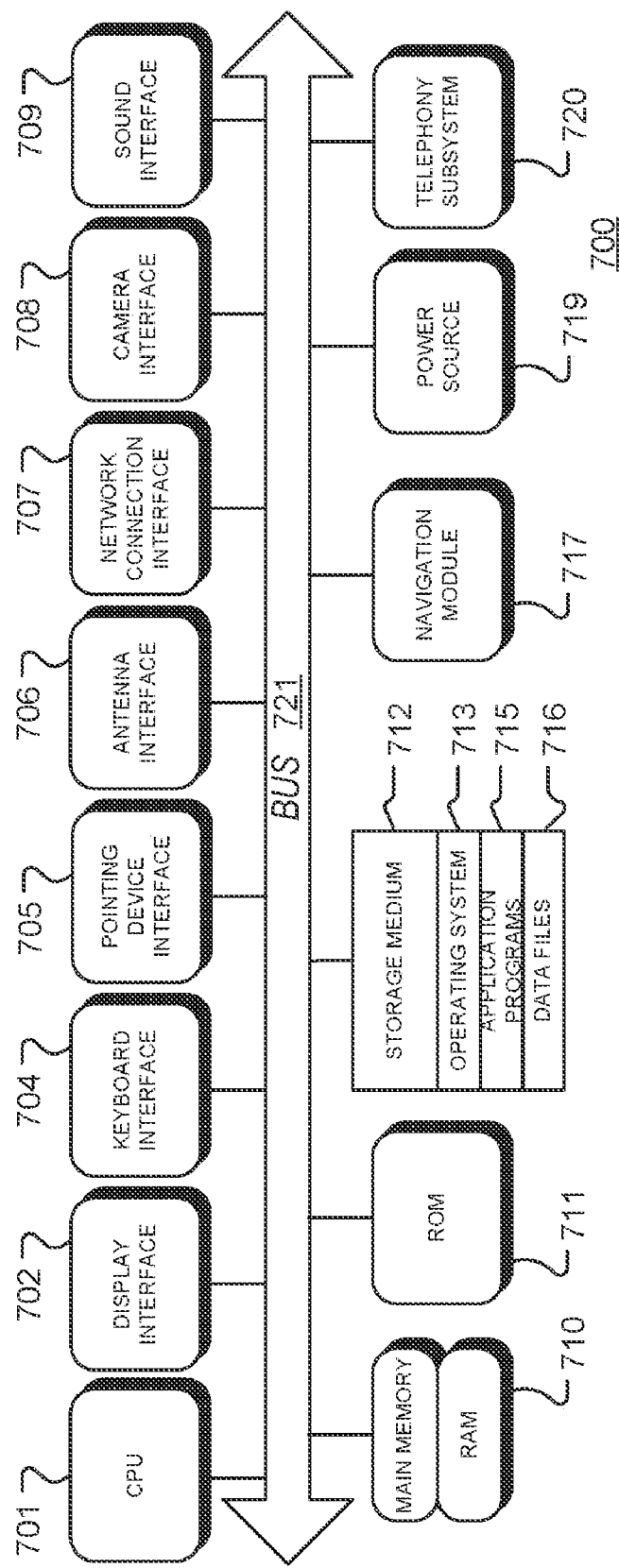
FIG. 7 is a block diagram illustrating additional details of the internal architecture of the device of FIG. 6.

FIG. 7 is a block diagram illustrating an internal architecture 700 of the device 600. The architecture includes a central processing unit (CPU) 701 where the computer instructions that comprise an operating system or an application are processed; a display interface 702 that provides a communication interface and processing functions for rendering video, graphics, images, and texts on the display 601, provides a set of built-in controls (such as buttons, text and lists), and supports diverse screen sizes; a keyboard interface 704 that provides a communication interface to the keyboard 602; a pointing device interface 705 that provides a communication interface to the pointing device 604; an antenna interface 706 that provides a communication interface to the antenna 605; a network connection interface 707 that provides a communication interface to a network over the computer network connection 606; a camera interface 708 that provides a communication interface and processing functions for capturing digital images from the camera 607; a sound interface 709 that provides a communication interface for converting sound into electrical signals using the microphone 609 and for converting electrical signals into sound using the speaker 610; a random access memory (RAM) 710 where computer instructions and data are stored in a volatile memory device for processing by the CPU 701; a read-only memory (ROM) 711 where invariant low-level systems code or data for basic system functions such as basic input and output (I/O), startup, or reception of keystrokes from the keyboard 602 are stored in a non-volatile memory device; a storage medium 712 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 713, application programs 715 (including, for example, a web browser application, a widget or gadget engine, and or other applications, as necessary) and data files 716 are stored; a navigation module 717 that provides a real-world or relative position or geographic location of the device 600; a power source 719 that provides an appropriate alternating current (AC) or direct current (DC) to power components; and a telephony subsystem 720 that allows the device 600 to transmit and receive sound over a telephone network. The constituent devices and the CPU 701 communicate with each other over a bus 721.

The CPU 701 can be one of a number of computer processors. In one arrangement, the computer CPU 701 is more than one processing unit. The RAM 710 interfaces with the computer bus 721 so as to provide quick RAM storage to the CPU 701 during the execution of software programs such as the operating system application programs, and device drivers. More specifically, the CPU 701 loads computer-executable process steps from the storage medium 712 or other media into a field of the RAM 710 in order to execute software programs. Data is stored in the RAM 710, where the data is accessed by the computer CPU 701 during execution. In one example configuration, the device 600 includes at least 128 MB of RAM, and 256 MB of flash memory.

The storage medium 712 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 600 to access computer-executable process steps, application programs and the like, stored on removable and non-removable memory media, to off-load data from the device 600, or to upload data onto the device 600.

A computer program product is tangibly embodied in storage medium 712, a machine-readable storage medium. The computer program product includes instructions that, when read by a machine, operate to cause a data processing apparatus to store image data in the mobile device. In some implementations, the computer program product includes instructions that generate interactive indicators.

The operating system 713 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 713 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 713, and the application programs 715 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 715 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, the GOOGLE gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible for interactive indicators to be provided using the above-described implementation, it is also possible to implement the functions described herein as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 717 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 717 may also be used to measure angular displacement, orientation, or velocity of the device 600, such as by using one or more accelerometers.

Figure 8:
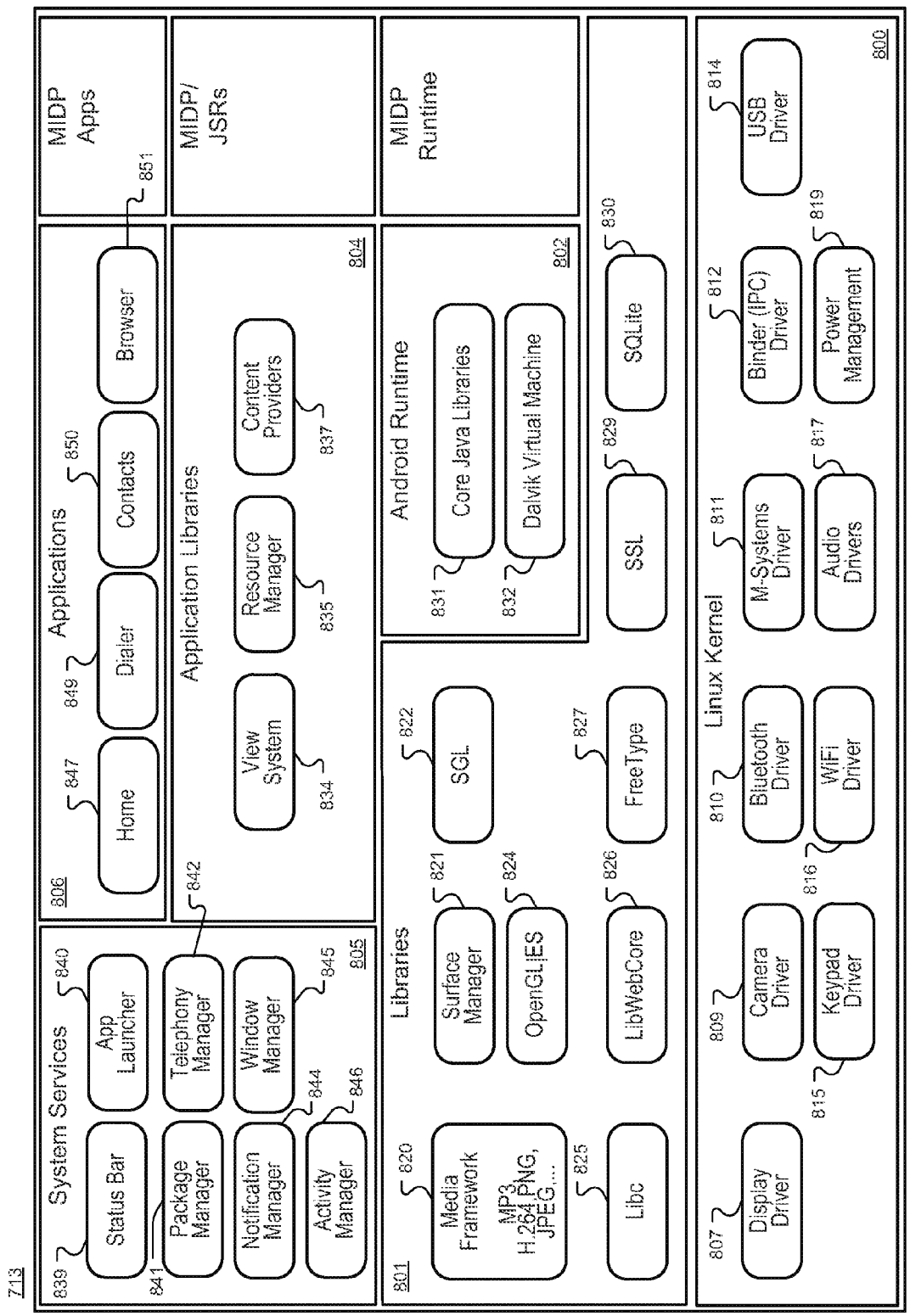
FIG. 8 is a block diagram illustrating exemplary components of the operating system used by the device of FIG. 6.

FIG. 8 is a block diagram illustrating exemplary components of the operating system 713 used by a device, in the case where the operating system 713 is the GOOGLE mobile device platform. The operating system 713 invokes multiple processes, while ensuring that the associated phone application is responsive, and that wayward applications do not cause a fault (or crash) of the operating system. Using task switching, the operating system 713 allows for the switching of applications while on a telephone call, without losing the state of each associated application. The operating system 713 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

In some implementations, the operating system 713 is organized into six components: a kernel 800, libraries 801, an operating system runtime 802, application libraries 804, system services 805, and applications 806. The kernel 800 includes a display driver 807 that allows software such as the operating system 713 and the application programs 715 to interact with the display 601 via the display interface 702, a camera driver 809 that allows the software to interact with the camera 607; a BLUETOOTH driver 810; an M-Systems driver 811; a binder (IPC) driver 812, a USB driver 814 a keypad driver 815 that allows the software to interact with the keyboard 602 via the keyboard interface 704; a WiFi driver 816; audio drivers 817 that allow the software to interact with the microphone 609 and the speaker 610 via the sound interface 709; and a power management component 819 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 801 include a media framework 820 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 821; a simple graphics library (SGL) 822 for two-dimensional application drawing; an Open Graphics Library for Embedded Systems (OpenGL ES) 824 for gaming and three-dimensional rendering; a C standard library (LIBC) 825; a LIBWEBCORE library 826; a FreeType library 827; an SSL 829; and an SQLite library 830.

The operating system runtime 802 includes core JAVA libraries 831, and a Dalvik virtual machine 832. The Dalvik virtual machine 832 is a custom virtual machine that runs a customized file format (.DEX).

The operating system 713 can also include Mobile Information Device Profile (MIDP) components such as the MIDP JAVA Specification Requests (JSRs) components, MIDP runtime, and MIDP applications as shown in FIG. 8. The MIDP components can support MIDP applications running on the device 600.

With regard to graphics rendering, a system-wide composer manages surfaces and a frame buffer and handles window transitions, using the OpenGL ES 824 and two-dimensional hardware accelerators for its compositions.

The Dalvik virtual machine 832 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 804 include a view system 834, a resource manager 835, and content providers 837. The system services 805 includes a status bar 839; an application launcher 840; a package manager 841 that maintains information for all installed applications; a telephony manager 842 that provides an application level JAVA interface to the media framework 820; a notification manager 844 (which may include components such as the display module 413, interface 431 and alert management module 434, shown in FIG. 4) that allows all applications access to the status bar and on-screen notifications; a window manager 845 that allows multiple applications with multiple windows to share the display 601; and an activity manager 846 that runs each application in a separate process, manages an application life cycle, and maintains a cross-application history.

The applications 806 include a home application 847, a dialer application 849, a contacts application 850, and a browser application 851.

The telephony manager 842 provides event notifications (such as phone state, network state, Subscriber Identity Module (SIM) status, or voicemail status or other static indicators described with reference to FIGS. 1 and 4 (see, e.g., elements 110, 113, 116, 419, 422, 425 and 428)), allows access to state information (such as network information, SIM information, or voicemail presence), initiates calls, and queries and controls the call state. The browser application 851 renders web pages in a full, desktop-like manager, including navigation functions. Furthermore, the browser application 851 allows single column, small screen rendering, and provides for the embedding of HTML views into other applications.

Figure 9:
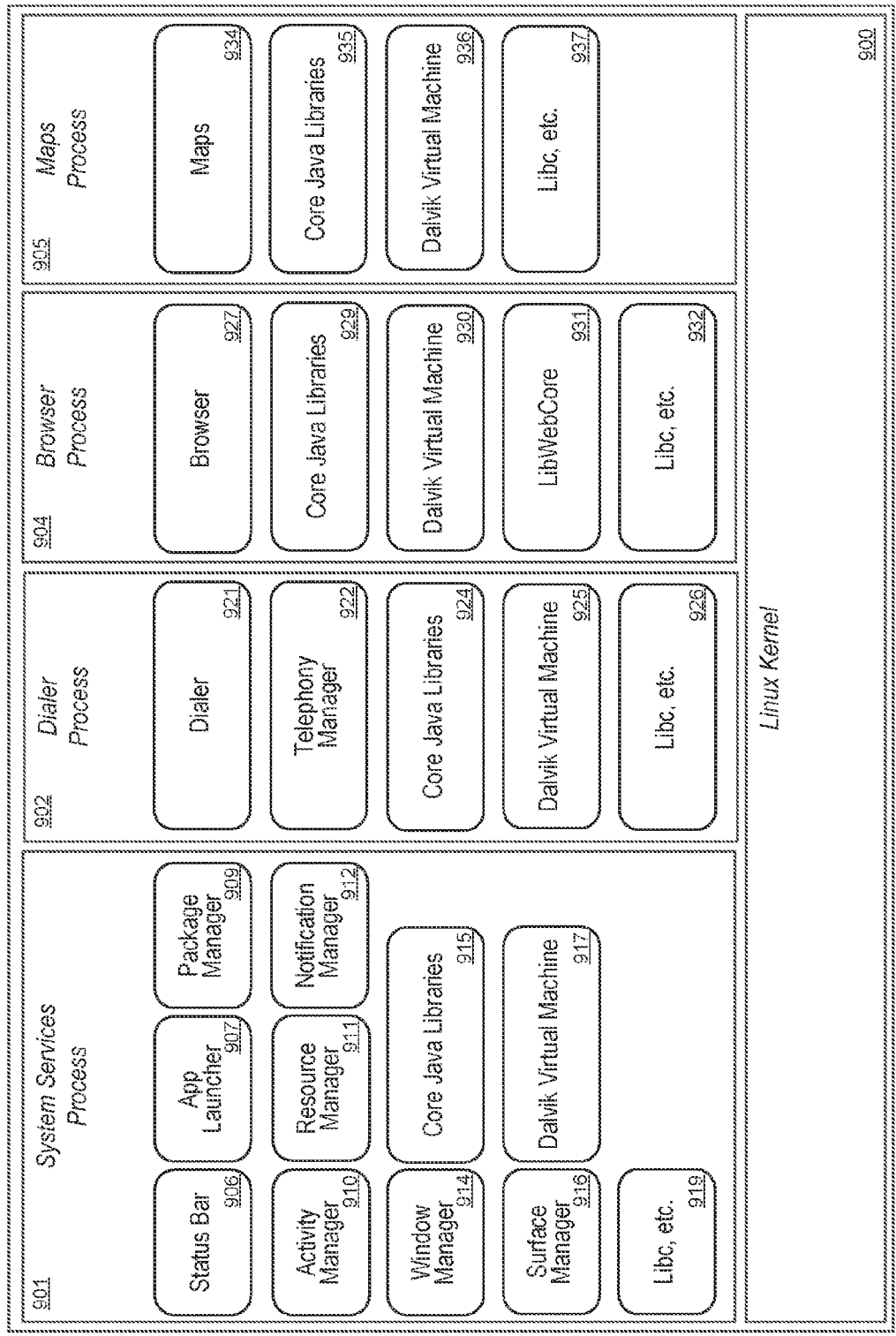
FIG. 9 is a block diagram illustrating exemplary processes implemented by the operating system of FIG. 8.

FIG. 9 is a block diagram illustrating exemplary processes implemented by the operating system kernel 900. Generally, applications and system services run in separate processes, where the activity manager 910 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 916, the window manager 914, the activity manager 910, or the notification manager 912 can be continuously executed while the device is powered. Additionally, some application-specific processes can also be persistent. For example, processes associated with the dialer application 921, may also be persistent.

The processes implemented by the operating system kernel 900 may generally be categorized as system services processes 901, dialer processes 902, browser processes 904, and maps processes 905. The system services processes 901 include status bar processes 906 associated with the status bar 839; application launcher processes 907 associated with the application launcher 840; package manager processes 909 associated with the package manager 841; activity manager processes 910 associated with the activity manager 846; resource manager processes 911 associated with a resource manager 835 that provides access to graphics, localized strings, and XML layout descriptions; notification manger processes 912 associated with the notification manager 844 (and alert management module 434, shown in FIG. 4); window manager processes 914 associated with the window manager 845; core JAVA libraries processes 915 associated with the core JAVA libraries 831; surface manager processes 916 associated with the surface manager 821; Dalvik virtual machine processes 917 associated with the Dalvik virtual machine 832; and LIBC processes 919 associated with the LIBC library 825.

The dialer processes 902 include dialer application processes 921 associated with the dialer application 849; telephony manager processes 922 associated with the telephony manager 842 (and device status monitor 419, shown in FIG. 4); core JAVA libraries processes 924 associated with the core JAVA libraries 831; Dalvik virtual machine processes 925 associated with the Dalvik Virtual machine 832; and LIBC processes 926 associated with the LIBC library 825.

The browser processes 904 include browser application processes 927 associated with the browser application 851; core JAVA libraries processes 929 associated with the core JAVA libraries 831; Dalvik virtual machine processes 930 associated with the Dalvik virtual machine 832; LIBWEBCORE processes 931 associated with the LIBWEBCORE library 826; and LIBC processes 932 associated with the LIBC library 825.

The maps processes 905 include maps application processes 934, core JAVA libraries processes 935, Dalvik virtual machine processes 936, and LIBC processes 937. Notably, some processes, such as the Dalvik virtual machine processes, may exist within one or more of the systems services processes 901, the dialer processes 902, the browser processes 904, and the maps processes 905.

Figure 10:
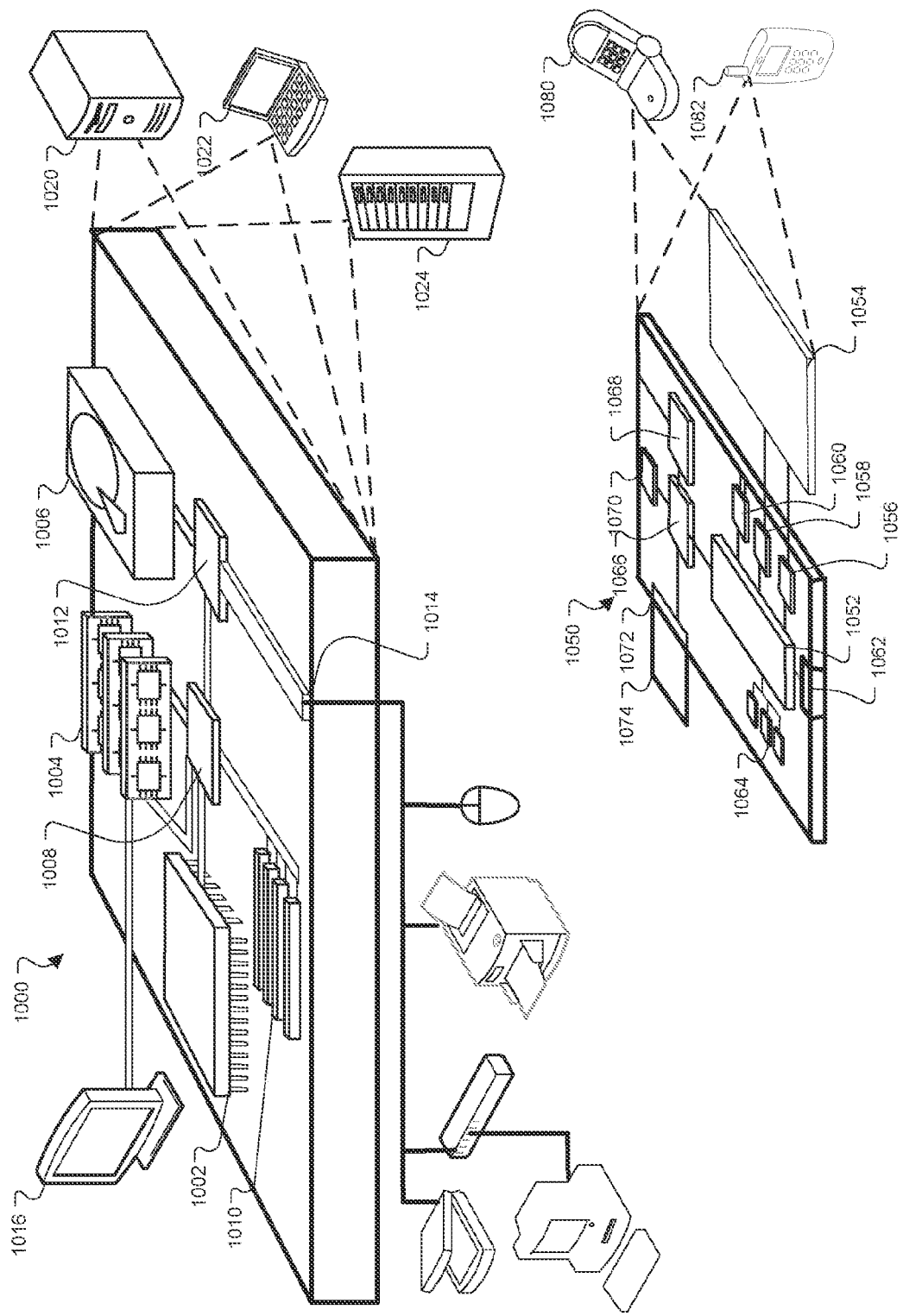
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low-speed interface 1012 connecting to low-speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, memory on processor 1002, or a propagated signal.

The high-speed controller 1008 manages bandwidth-intensive operations for the computing device 1000, while the low-speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosed implementations. For example, interactive indicators can be provided for various mobile devices, even though the examples and figures herein generally relate to mobile communication devices (e.g., smartphones). Moreover, interactive indicators can be provided for other devices that are not traditionally characterized as mobile devices—particularly devices that have a touch-sensitive display. In particular, for example, dash-mounted vehicle navigation systems, and display-equipped consumer appliances (e.g., washers, dryers, dishwashers, microwaves, refrigerators, wine cabinets, coffee makers, etc) can also provide interactive indicators. The interactive indicators can be associated with virtually any application, in addition to those applications described above. Two or three levels of detail are described, but other numbers of levels of detail can be provided as well. Example methods of providing interactive indicator information have been described (e.g., scrolling messages, pop-up windows, etc.), but the reader will appreciate that the principles described herein can be applied to other methods of providing interactive indicators. Accordingly, other implementations are within the scope of the following claims.

What is claimed is:

1. A computer-implemented method for displaying alert information, the method comprising:
    in a mobile computing device having a display screen, displaying a plurality of device status indicator icons that each have a changeable graphical representation that indicates a current status of a parameter for the computing device, in a status area of a graphical user interface on the display screen, wherein the status area is configured to display the plurality of device status indicator icons without regard to whether applications are executing on the device;
    receiving information from an application to display an alert in the status area;
    displaying in the status area a first level of textual information for the alert and a user-selectable control;
    displaying, in response to user selection input selecting the user-selectable control, a second level of information for the alert that provides greater detail than the first level of textual information, wherein the first level of textual information displayed in the status area includes text that describes the second level of information; and
    in response to additional user selection input selecting the second level of information, activating an application associated with the received information, wherein the application is focused on a third level of information for the alert that provides greater detail than the first level or second level of information.

2. The computer-implemented method of claim 1, wherein the status area is in the form of a status bar that includes slots for displaying icons that represent a device battery level and a status of one or more network connections.

3. The computer-implemented method of claim 1, wherein display of the icons is replaced with display of the first level of textual information for a temporary period after the information to display the alert is received.

4. The computer-implemented method of claim 1, wherein the status area spans across the display screen.

5. The computer-implemented method of claim 1, wherein the displayed device status indicator icons comprise static indicators, and wherein the displayed first level of textual information for the alert comprises an active indicator.

6. A computer-implemented method for displaying alert information with a mobile computing device, the method comprising:
    displaying a plurality of device status indicator icons that each have a changeable graphical representation that indicates a current status of a parameter for the computing device, in a status area of a graphical user interface on a display screen of the computing device, wherein the status area is configured to display the plurality of device status indicator icons without regard to whether applications are executing on the device;
    receiving information from an application to display an alert in the status area;
    displaying in the status area a first level of textual information for the alert and a user-selectable control; and
    displaying, in response to a selection of the user-selectable control, a second level of information for the alert that provides greater detail than the first level of textual information, wherein the first level of textual information displayed in the status area includes text that describes the second level of information.

7. The computer-implemented method of claim 6, further comprising superimposing the first level of textual information over the device status indicator icons.

8. The computer-implemented method of claim 7, wherein superimposing the first level of textual information over the device status indicator icons includes scrolling the first level of information through the status area over the device status indicator icons.

9. The computer-implemented method of claim 6, wherein the first level of textual information includes preview content related to the second level of information.

10. The computer-implemented method of claim 9, further comprising removing the preview content after a user review period.

11. The computer-implemented method of claim 6, further comprising increasing a size of the user-selectable control while the user-selectable control is being selected and permitting selection of another user-selectable control by movement of a selector.

12. The computer-implemented method of claim 11, wherein increasing the size of the user-selectable control comprises increasing the size of the user-selectable control one or more times, to a predetermined maximum size, while the user-selectable control remains selected.

13. The computer-implemented method of claim 6, wherein the second level of information is displayed in a pop-up box near the user-selectable control.

14. The computer-implemented method of claim 6, further comprising activating an application associated with the received information, wherein the application is focused on a third level of information for the alert that provides greater detail than the first level or second level of information.

15. The computer-implemented method of claim 14, wherein activating the application comprises activating the application in response to a selection of the second level of information.

16. The computer-implemented method of claim 14, wherein the first level of textual information comprises a short message service (SMS) snippet, the second level of information comprises an SMS message, and the application comprises an SMS message manager.

17. The computer-implemented method of claim 14, wherein the first level of textual information comprises an electronic mail snippet, the second level of information comprises an electronic mail message portion that is larger than the snippet, and the application comprises an electronic mail application.

18. A computer-implemented mobile device alert management system, comprising:
an interface configured to receive status alert information from applications on a mobile device;
an alert management module configured to receive the status alert information from the interface and provide multiple levels of detail of the status alert information; and
a display module configured to:
(i) display, in a status area of a display screen of the mobile device, a plurality of device status indicator icons that each have a graphical representation that indicates a current status of a parameter for the mobile device, wherein the status area is configured to display the plurality of device status indicator icons without regard to whether the applications are executing; and
(ii) receive the multiple levels of detail of the status alert information and to display at least a first level of detail of the status alert information in the status area, wherein the display of the first level of detail includes text that describes a second level of detail of the multiple levels of detail of the status alert information.

19. The computer-implemented mobile device alert management system of claim 18, wherein the alert management module is configured to initially present the first level of detail of the alert information and to present the second level of detail when selection input is received, the selection input indicating that the first level of detail has been selected.

20. The computer-implemented mobile device alert management system of claim 19, further comprising a touch-sensitive input device configured to receive the selection input.

21. The computer-implemented mobile device alert management system of claim 18, wherein the interface is configured to activate an application associated with the status alert information when additional selection input has been received, the additional selection input indicating that the second level of detail has been selected.

22. The computer-implemented mobile device alert management system of claim 18, wherein the interface is configured to prevent the display module from being directly accessed by the applications.

23. The computer-implemented mobile device alert management system of claim 22, wherein the interface is configured to receive the status alert information from an application and initiate a protected function call that incorporates at least a portion of the received status alert information, wherein the protected function call is not directly accessible to the applications.

24. The computer-implemented mobile device alert management system of claim 18, further comprising a static indicator module configured to display in the status area the plurality of device status indicator, wherein the plurality of device status indicator icons includes at least one of an indication of remaining on-board power in the mobile device or an indication of signal strength of a wireless channel over which the mobile device sends and receives information.

25. The computer-implemented mobile device alert management system of claim 24, wherein the display module is configured to display the alert information in the status area of the mobile device in a manner that is more prominent than the plurality of device status indicator icons during a user-review period.

26. A computer-implemented mobile device alert management system, comprising:
an interface configured to receive status alert information from applications on a mobile device;
an alert management means for receiving the status alert information from the interface and providing multiple levels of detail of the status alert information; and
a display module configured to:
(i) display, in a status area of a display screen of the mobile device, a plurality of device status indicator icons that each have a graphical representation that indicates a current status of a parameter for the mobile device, wherein the status area is configured to display the plurality of device status indicator icons without regard to whether the applications are executing; and
(ii) receive the multiple levels of detail of the status alert information and to display at least a first level of detail of the status alert information in the status area, wherein the display of the first level of detail includes text that describes a second level of detail of the multiple levels of detail of the status alert information.

* * * * *